United States Patent
Itamoto et al.

(10) Patent No.: US 10,946,890 B2
(45) Date of Patent: Mar. 16, 2021

(54) STEERING CONTROL UNIT

(71) Applicant: JTEKT CORPORATION, Osaka (JP)

(72) Inventors: Hidenori Itamoto, Tajimi (JP); Takashi Kageyama, Okazaki (JP); Toshie Hibi, Okazaki (JP); Akihiro Tomita, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 175 days.

(21) Appl. No.: 16/191,857

(22) Filed: Nov. 15, 2018

(65) Prior Publication Data
US 2019/0152514 A1 May 23, 2019

(30) Foreign Application Priority Data

Nov. 22, 2017 (JP) .............................. JP2017-225204

(51) Int. Cl.
| | | |
|---|---|---|
| B62D 5/04 | (2006.01) | |
| H02K 11/33 | (2016.01) | |
| H02P 29/024 | (2016.01) | |
| H02P 1/00 | (2006.01) | |
| H02P 6/182 | (2016.01) | |
| H02P 27/14 | (2006.01) | |
| H02P 27/08 | (2006.01) | |

(52) U.S. Cl.
CPC ........... B62D 5/046 (2013.01); B62D 5/0472 (2013.01); B62D 5/0484 (2013.01); H02K 11/33 (2016.01); H02P 1/00 (2013.01); H02P 6/182 (2013.01); H02P 29/0241 (2016.02); *H02P 27/085* (2013.01); *H02P 27/14* (2013.01)

(58) Field of Classification Search
CPC .... B62D 5/046; B62D 5/0484; B62D 5/0472; H02P 27/14; H02P 27/085; H02P 6/182; H02P 1/00; H02P 29/0241; H02K 11/33
See application file for complete search history.

(56) References Cited

U.S. PATENT DOCUMENTS

| | | | |
|---|---|---|---|
| 2014/0207335 A1* | 7/2014 | Mikamo ................ | B62D 5/046 701/41 |
| 2017/0113720 A1* | 4/2017 | Kodera ................. | B62D 5/008 |

FOREIGN PATENT DOCUMENTS

| | | |
|---|---|---|
| JP | 2008-220100 A | 9/2008 |
| JP | 2014-138530 A | 7/2014 |

OTHER PUBLICATIONS

May 10, 2019 Extended Search Report issued in European Application No. 18207571.3.

* cited by examiner

*Primary Examiner* — Hunter B Lonsberry
*Assistant Examiner* — Mathew Franklin Gordon
(74) *Attorney, Agent, or Firm* — Oliff PLC

(57) ABSTRACT

Provided is a steering control unit for improving influence of fluctuations in an estimated electrical angle on steering feel. A steering control unit includes a microcomputer that performs sensorless control of the driving of a motor by using an estimated electrical angle estimated by calculation. The microcomputer calculates the estimated electrical angle from a value that is obtained by selectively accumulating a first additional angle or a second additional angle. The microcomputer adjusts a vibration component of fluctuations in the estimated electrical angle by varying the amount of change in the first additional angle and the second additional angle.

6 Claims, 6 Drawing Sheets

STEERING CONTROL UNIT

INCORPORATION BY REFERENCE

The disclosure of Japanese Patent Application No. 2017-225204 filed on Nov. 22, 2017 including the specification, drawings and abstract is incorporated herein by reference in its entirety.

BACKGROUND OF THE INVENTION

1. Field of the Invention

The invention relates to a steering control unit.

2. Description of Related Art

Japanese Patent Application Publication No. 2014-138530 (JP 2014-138530 A) discloses an electric power steering system that supplies motor torque as an assist force on the basis of a steering torque input to a vehicle steering mechanism. A steering control unit of the electric power steering system performs sensorless control of the driving of the motor by using an estimated electrical angle instead of an electrical angle based on a detection result from a rotation angle sensor that detects a rotation angle of the motor. The estimated electrical angle is estimated from a value that is obtained by accumulating an additional angle calculated on the basis of a voltage (a counter electromotive voltage) induced in the motor.

The sensorless control disclosed in JP 2014-138530 A may cause the motor to vibrate or lose synchronization due to fluctuations in the estimated electrical angle. Thus, the fluctuations in the estimated electrical angle may affect steering feel.

SUMMARY OF THE INVENTION

A purpose of the invention is to provide a steering control unit for improving influence of fluctuations in an estimated electrical angle on steering feel.

A steering control unit according to an aspect of the invention includes a control circuit that is configured to perform sensorless control of driving of a motor by using an estimated electrical angle estimated by calculation. The motor is a source of an assist force that is supplied to a steering mechanism on the basis of steering torque that is input to the steering mechanism to steer a steered wheel of a vehicle. The control circuit calculates an additional angle when calculating the estimated electrical angle. The control circuit calculates the estimated electrical angle from a value that is obtained by accumulating the additional angle. The control circuit adjusts a vibration component of fluctuations in the estimated electrical angle by varying the amount of change in the additional angle.

According to this aspect, varying the amount of change in the additional angle controls the fluctuations in the estimated electrical angle, and thus controls the likelihood of the motor vibrating or losing synchronization due to the fluctuations in the estimated electrical angle. For example, the fluctuations in the estimated electrical angle may be adjusted in such a way as to suppress interference of vibrations of the motor with steering operation by a driver, or in such a way as to reduce frequency with which the motor loses synchronization in order to reduce drag that a driver feels when he or she performs the steering operation. Thus, steering feel is flexibly adjustable. This makes it possible to improve the influence of the fluctuations in the estimated electrical angle on steering feel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
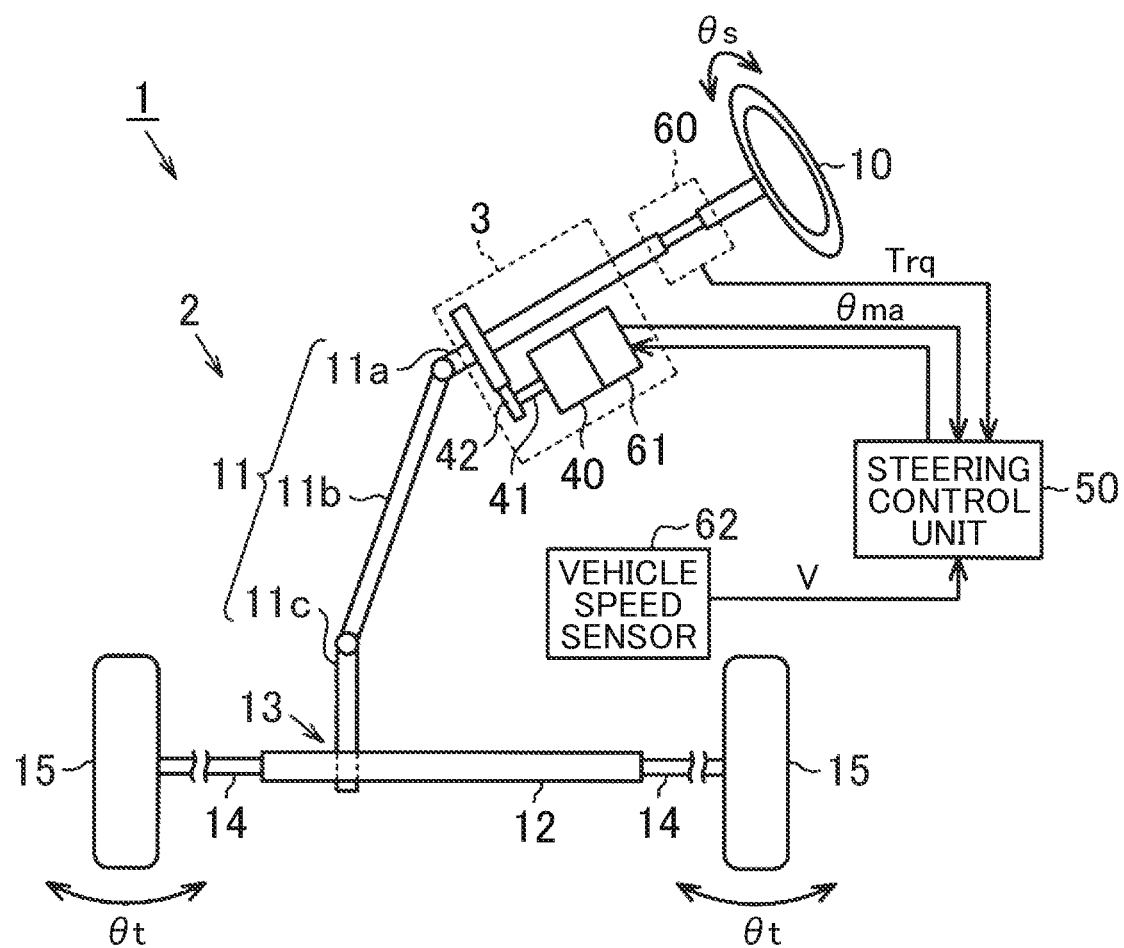
FIG. 1 is a diagram schematically illustrating an electric power steering system.

A steering control unit according to an embodiment of the invention is described below. As illustrated in FIG. 1, an electric power steering system 1 includes the following: a steering mechanism 2 that steers steered wheels 15 in accordance with steering operation that a driver performs to operate a steering wheel 10; and an assist mechanism 3 that assists a driver in performing the steering operation.

The steering mechanism 2 includes the steering wheel 10 and a steering shaft 11 that is fixed with respect to the steering wheel 10. The steering shaft 11 includes the following: a column shaft 11a coupled to the steering wheel 10; an intermediate shaft 11b coupled to the lower end of the column shaft 11a; and a pinion shaft 11c coupled to the lower end of the intermediate shaft 11b. The lower end of the pinion shaft 11c is coupled via a rack and pinion mechanism 13 to a rack shaft 12 as a steered shaft. The rack shaft 12 is supported by a rack housing (not illustrated). The right and left steered wheels 15 are respectively coupled to the right and left ends of the rack shaft 12 via tie rods 14. Thus, the rack and pinion mechanism 13, including the pinion shaft 11c and the rack shaft 12, converts rotary motion of the steering wheel 10, i.e., rotary motion of the steering shaft 11, to reciprocating linear motion of the rack shaft 12 in an axial direction (a lateral direction in FIG. 1). The reciprocating linear motion is transmitted to the steered wheels 15 via the tie rods 14 that are coupled to the respective ends of the rack shaft 12, and thus steered angles θt of the steered wheels 15 change.

The assist mechanism 3 includes a motor 40 that is a source of power (an assist force) to be supplied to the steering mechanism 2. For example, the motor 40 is a three-phase brushless motor and is rotated on the basis of three-phase (U, V, W) driving electric power. A rotating shaft 41 of the motor 40 is coupled to the column shaft 11a via a speed reduction mechanism 42. The assist mechanism 3 converts, through the speed reduction mechanism 42, the rotational force of the rotating shaft 41 of the motor 40 to a force that causes the rack shaft 12 to linearly reciprocate in the axial direction. This axial force applied to the rack shaft 12 serves as power (an assist force) to change the steered angles θt of the steered wheels 15.

As illustrated in FIG. 1, the motor 40 is connected to a steering control unit 50 that controls the driving of the motor 40. On the basis of detection results from various types of sensors, the steering control unit 50 controls a controlled variable for the motor 40, i.e., controls the supply of electric current to the motor 40, thereby controlling the driving of the motor 40. Examples of the sensors may include a torque sensor 60, a rotation angle sensor 61, and a vehicle speed sensor 62. The torque sensor 60 is provided to the column shaft 11a. The rotation angle sensor 61 is provided to the motor 40. The torque sensor 60 detects a steering torque Trq that is an operation state quantity generated at the steering shaft 11 and that changes in response to the steering operation performed by a driver. The rotation angle sensor 61 detects a rotation angle (an electrical angle) θma of the rotating shaft 41 of the motor 40. The vehicle speed sensor 62 detects a vehicle speed V that is the traveling speed of a vehicle.

Figure 2:
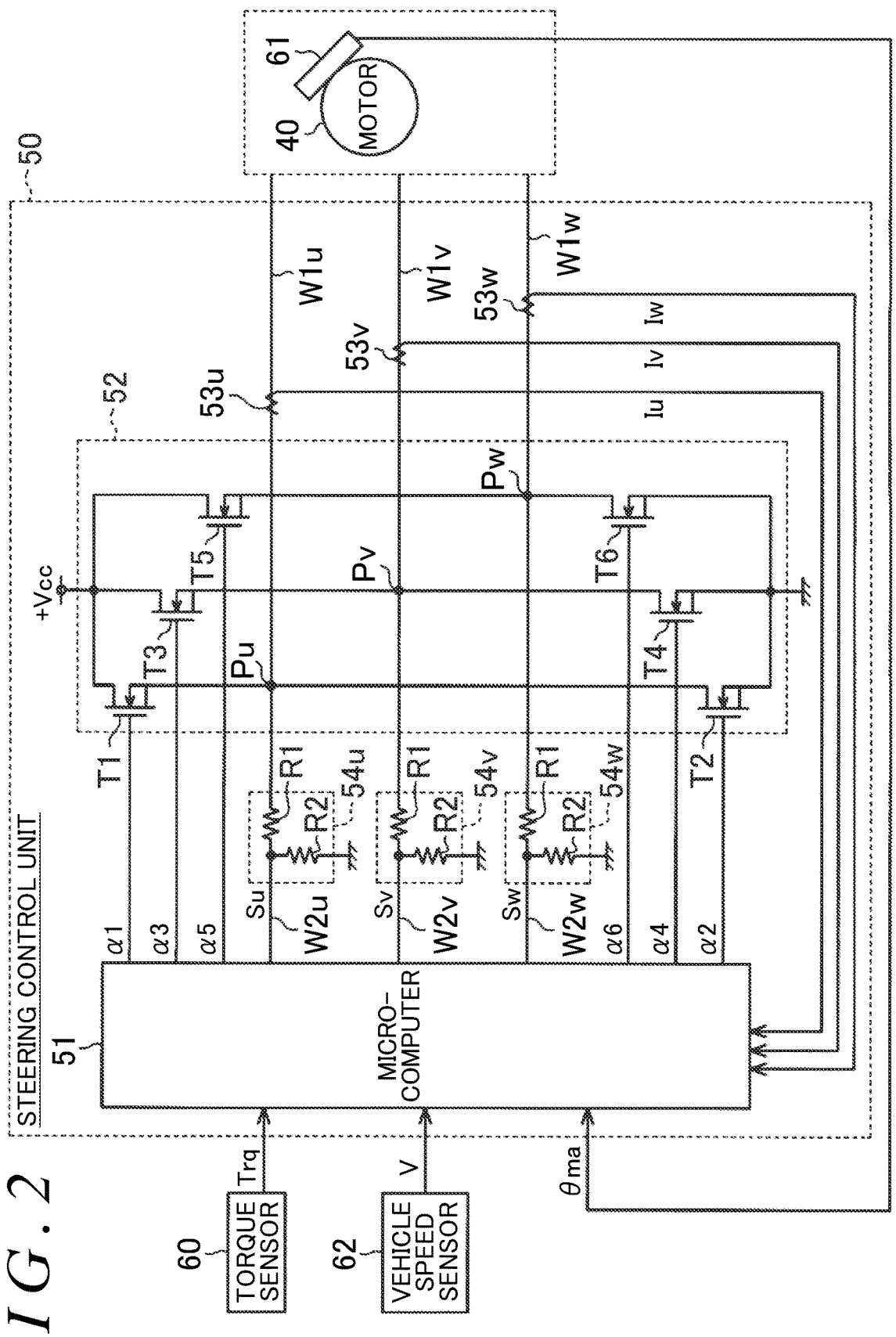
FIG. 2 is a block diagram illustrating the electrical structure of the electric power steering system.

Next, the electrical structure of the electric power steering system 1 is described. As illustrated in FIG. 2, the steering control unit 50 includes the following: a microcomputer 51 that generates a motor control signal required to drive the motor 40; and a drive circuit 52 that supplies electric current to the motor 40 on the basis of the motor control signal. The microcomputer 51 receives the detection results from the torque sensor 60, the rotation angle sensor 61, and the vehicle speed sensor 62. The microcomputer 51 further receives phase current values Iu, Iv, and Iw of the motor 40. The phase current values Iu, Iv, and Iw are respectively detected by current sensors 53u, 53v, and 53w that are respectively provided to power supply lines W1u, W1v, and W1w that connect the drive circuit 52 and the motor 40. The microcomputer 51 further receives phase terminal voltage values Vu, Vv, and Vw of the motor 40. The phase terminal voltage values Vu, Vv, and Vw are respectively detected by voltage sensors 54u, 54v, and 54w that are respectively provided to signal lines W2u, W2v, and W2w that connect the microcomputer 51 and the drive circuit 52. More specifically, the microcomputer 51 receives detection signals Su, Sv, and Sw that are respectively output from the voltage sensors 54u, 54v, and 54w on the basis of the detected phase terminal voltage values Vu, Vv, and Vw. The microcomputer 51 generates and outputs pulse width modulation (PWM) drive signals α1 to α6, as the motor control signal, to the drive circuit 52 so as to drive the drive circuit 52 with pulse width modulation. According to the embodiment, the microcomputer 51 is an example of a control circuit.

The drive circuit 52 includes switching elements T1 to T6. The switching elements T1, T3, and T5 form upper arms for connecting a positive terminal of a direct current (DC) power source (with a power supply voltage +Vcc), such as an in-vehicle battery, to terminals of the motor 40. The switching elements T2, T4, and T6 form lower arms for connecting a negative terminal of the DC power source to the terminals of the motor 40. Thus, the drive circuit 52 includes three pairs of upper and lower arms: the switching elements T1 and T2; the switching elements T3 and T4; and the switching elements T5 and T6. A midpoint Pu between the switching elements T1 and T2 is connected to a U-phase coil of the motor 40 via the power supply line W1u. A midpoint Pv between the switching elements T3 and T4 is connected to a V-phase coil of the motor 40 via the power supply line W1v. A midpoint Pw between the switching elements T5 and T6 is connected to a W-phase coil of the motor 40 via the power supply line W1w. In the drive circuit 52, the switching elements T1 to T6 are switched on and off in accordance with the PWM drive signals α1 to α6 output from the microcomputer 51, so that a DC voltage supplied from the DC power source (with the power supply voltage +Vcc) is converted to three phase (U, V, and W phases) alternating-current (AC) voltages. The converted U, V, and W phase AC voltages are respectively supplied to the U, V, and W phase coils of the motor 40 through the power supply lines W1u, W1v, and W1w to drive the motor 40.

The voltage sensors 54u, 54v, and 54w are respectively connected to the midpoints Pu, Pv, and Pw of the switching elements T1 to T6. Each of the voltage sensors 54u, 54v, and 54w has resistors R1 and R2 that form a voltage divider to divide the corresponding detected phase terminal voltage. The voltage sensors 54u, 54v, and 54w respectively output, to the microcomputer 51 through the signal lines W2u, W2v, and W2w, the divided voltages as the detection signals Su, Sv, and Sw.

Next, the functions of the microcomputer 51 are described in detail. Although not illustrated in the drawings, the microcomputer 51 includes a central processing unit (CPU) and a memory device. The CPU repeatedly executes a program stored in the memory device with a predetermined control period, thereby controlling the driving of the motor 40.

Figure 3:
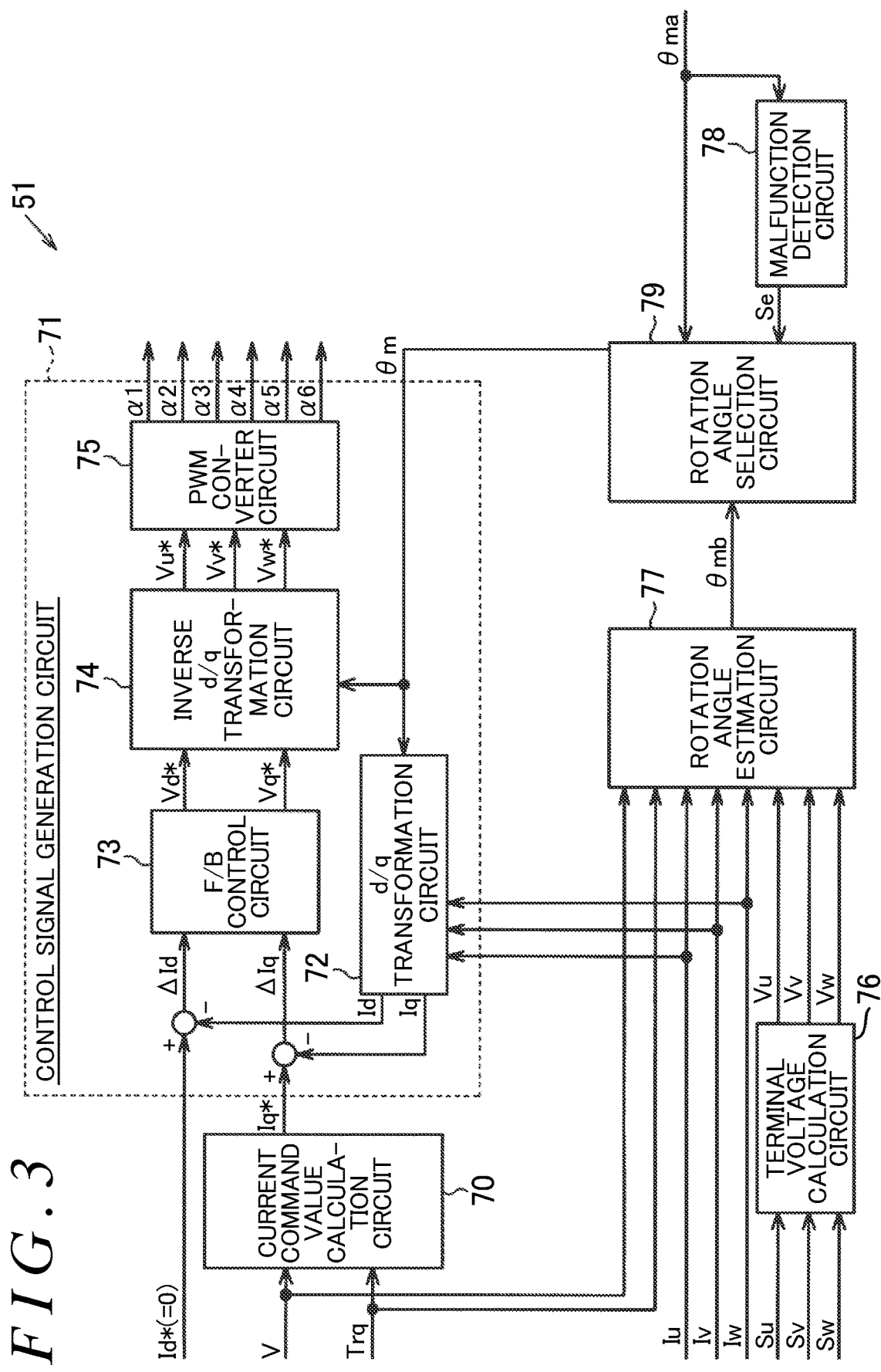
FIG. 3 is a block diagram illustrating the functions of a microcomputer of a steering control unit of the electric power steering system.

As illustrated in FIG. 3, the microcomputer 51 includes a current command value calculation circuit 70 and a control signal generation circuit 71. The current command value calculation circuit 70 calculates (generates) a current command value that is a target value for the amount of electric current corresponding to an assist force that the motor 40 needs to produce. The control signal generation circuit 71 generates the PWM drive signals α1 to α6 corresponding to the current command value.

The current command value calculation circuit 70 receives the vehicle speed V and the steering torque Trq. On the basis of the vehicle speed V and the steering torque Trq, the current command value calculation circuit 70 calculates and generates a q-axis current command value Iq* that is the current command value for a q-axis of a d/q coordinate system. The current command value calculation circuit 70 generates the q-axis current command value Iq* such that the absolute value of the q-axis current command value Iq* increases with an increase in the absolute value of the steering torque Trq and also increases with a decrease in the vehicle speed V. According to the embodiment, the microcomputer 51 fixes, to zero (a zero value), a d-axis current command value Id* that is the current command value for a d-axis of the d/q coordinate system.

The control signal generation circuit 71 receives the following: the q-axis current command value Iq* generated by the current command value calculation circuit 70; the d-axis current command value Id* (a zero value); the phase current values Iu, Iv, and Iw; and an electrical angle θm (an electrical angle for control). On the basis of the phase current values Iu, Iv, and Iw and the electrical angle θm, the control signal generation circuit 71 performs current feedback control that causes the actual value of electric current through the motor 40 to follow the q-axis current command value Iq*, thereby generating and outputting the PWM drive signals α1 to α6 to the drive circuit 52. According to the embodiment, either the rotation angle (an electrical angle) θma detected by the rotation angle sensor 61 or an estimated electrical angle θmb calculated (generated) by a later-described rotation angle estimation circuit 77 is input as the electrical angle θm to the control signal generation circuit 71.

Specifically, the control signal generation circuit 71 includes a d/q transformation circuit 72, a feedback control circuit (hereinafter referred to as a F/B control circuit) 73, an inverse d/q transformation circuit 74, and a PWM converter circuit 75. The d/q transformation circuit 72 receives the phase current values Iu, Iv, and Iw, and the electrical angle θm. On the basis of the electrical angle θm, the d/q transformation circuit 72 maps the phase current values Iu, Iv, and Iw on the d/q coordinates, thereby calculating and generating a d-axis current value Id and a q-axis current value Iq that indicate the actual value of electric current through the motor 40 in the d/q coordinate system.

The F/B control circuit 73 receives a d-axis current deviation ΔId and a q-axis current deviation ΔIq. The d-axis and q-axis current deviations ΔId and ΔIq are respectively obtained by subtracting the d-axis and q-axis current values Id and Iq generated by the d/q transformation circuit 72, from the d-axis and q-axis current command values Id* and Iq* generated by the current command value calculation circuit 70. Further, the F/B control circuit 73 performs current feedback control based on the d-axis current deviation ΔId to cause the d-axis current value Id to follow the d-axis current command value Id*, thereby calculating and generating a d-axis voltage command value Vd*. Likewise, the F/B control circuit 73 performs current feedback control based on the q-axis current deviation ΔIq to cause the q-axis current value Iq to follow the q-axis current command value Iq*, thereby calculating and generating a q-axis voltage command value Vq*.

The inverse d/q transformation circuit 74 receives the d-axis and q-axis voltage command values Vd* and Vq* generated by the F/B control circuit 73, and the electrical angle θm. On the basis of the electrical angle θm, the inverse d/q transformation circuit 74 maps the d-axis and q-axis voltage command values Vd* and Vq* on a three-phase AC coordinate system, thereby calculating and generating phase voltage command values Vu*, Vv*, and Vw* in the three-phase AC coordinate system.

The PWM converter circuit 75 receives the phase voltage command values Vu*, Vv*, and Vw* generated by the inverse d/q transformation circuit 74. The PWM converter circuit 75 generates the PWM drive signals α1 to α6 by PWM conversion of the phase voltage command values Vu*, Vv*, and Vw*. The PWM drive signals α1 to α6 are respectively applied to gate terminals of the switching elements T1 to T6 of the drive circuit 52.

When a malfunction occurs that causes the rotation angle sensor 61 to fail to detect normal values, the microcomputer 51 performs sensorless control as backup control to continue to control the driving of the motor 40. The sensorless control uses the estimated electrical angle θmb estimated by calculation, instead of the rotation angle θma based on the detection result from the rotation angle sensor 61.

As illustrated in FIG. 3, the microcomputer 51 includes a terminal voltage calculation circuit 76, the rotation angle estimation circuit 77, a malfunction detection circuit 78, and a rotation angle selection circuit 79. The terminal voltage calculation circuit 76 receives the detection signals Su, Sv, and Sw from the voltage sensors 54u, 54v, and 54w. On the basis of the detection signals Su, Sv, and Sw, the terminal voltage calculation circuit 76 calculates and generates the phase terminal voltage values Vu, Vv, and Vw of the motor 40.

The rotation angle estimation circuit 77 receives the phase terminal voltage values Vu, Vv, and Vw generated by the terminal voltage calculation circuit 76, the steering torque Trq, the vehicle speed V, and the phase current values Iu, Iv, and Iw. On the basis of the phase terminal voltage values Vu, Vv, and Vw, the steering torque Trq, the vehicle speed V, and the phase current values Iu, Iv, and Iw, the rotation angle estimation circuit 77 calculates and generates the estimated electrical angle θmb.

The malfunction detection circuit 78 receives the rotation angle θma. On the basis of the rotation angle θma, the malfunction detection circuit 78 detects whether a malfunction occurs that causes the rotation angle sensor 61 to fail to detect normal values. Upon detection of the malfunction, the malfunction detection circuit 78 generates a malfunction detection signal Se indicating the occurrence of the malfunction. For example, the malfunction detection circuit 78 detects the malfunction when the absolute value of the difference between the present and previous values of the rotation angle θma falls outside a predetermined allowable range. The allowable range is set such that the malfunction is detectable, by taking into account the control period of the microcomputer 51 and sensor tolerances of the rotation angle sensor 61.

The rotation angle selection circuit 79 receives the estimated electrical angle θmb generated by the rotation angle estimation circuit 77, the malfunction detection signal Se generated by the malfunction detection circuit 78, and the rotation angle θma. When the malfunction detection signal Se is not input to the rotation angle selection circuit 79, i.e., when the rotation angle sensor 61 does not malfunction (i.e., functions normally), the rotation angle selection circuit 79 outputs the rotation angle θma, detected by the rotation angle sensor 61, as the electrical angle θm so that the rotation angle θma is used as an electrical angle for control. In this case, the control signal generation circuit 71 uses the rotation angle θma as the electrical angle θm to perform various calculations.

In contrast, when the malfunction detection signal Se is input to the rotation angle selection circuit 79, i.e., when the rotation angle sensor 61 malfunctions (i.e., does not function normally), the rotation angle selection circuit 79 outputs the estimated electrical angle θmb, generated by the rotation angle estimation circuit 77, as the electrical angle θm so that the estimated electrical angle θmb is used, instead of the rotation angle θma detected by the rotation angle sensor 61, as an electrical angle for control. In this case, the control signal generation circuit 71 uses the estimated electrical angle θmb as the electrical angle θm to perform various calculations.

Figure 4:
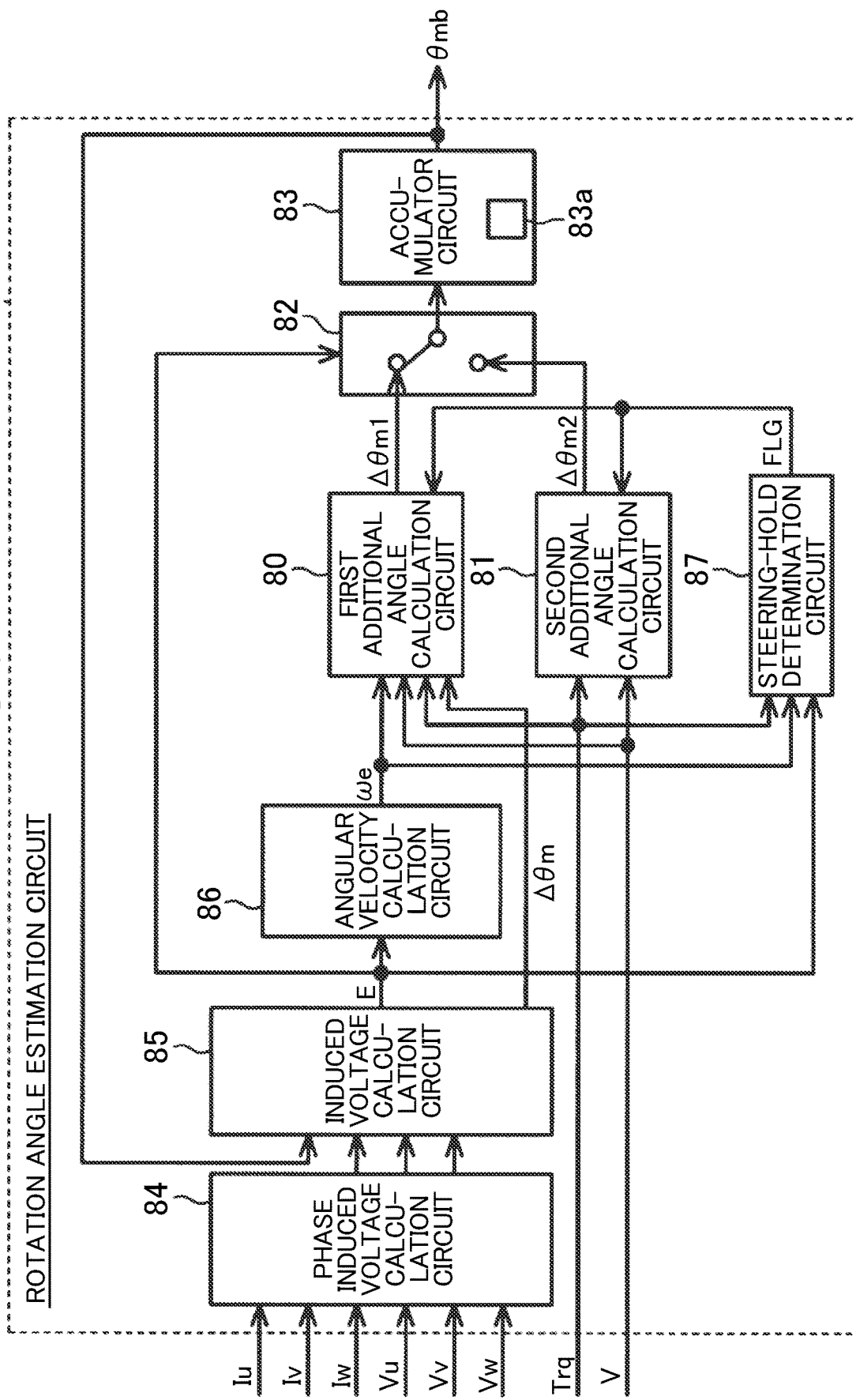
FIG. 4 is a block diagram illustrating the function of a rotation angle estimation circuit of the microcomputer.

The function of the rotation angle estimation circuit 77 is described in more detail below. As illustrated in FIG. 4, the rotation angle estimation circuit 77 includes a first additional angle calculation circuit 80 and a second additional angle calculation circuit 81. The first additional angle calculation circuit 80 calculates a first additional angle Δθm1 that is used to calculate (estimate) the estimated electrical angle θmb on the basis of a voltage induced in the motor 40. The second additional angle calculation circuit 81 calculates a second additional angle Δθm2 that is used to calculate (estimate) the estimated electrical angle θmb on the basis of the steering torque Trq. The rotation angle estimation circuit 77 further includes a switch circuit 82 and an accumulator circuit 83. The switch circuit 82 selects which of the calculation results from the first and second additional angle calculation circuits 80 and 81 is used to calculate the estimated electrical angle θmb. The accumulator circuit 83 adds either the first additional angle Δθm1 or the second additional angle Δθm2 to the previous value of the estimated electrical angle θmb, thereby calculating (generating) the estimated electrical angle θmb.

First, how to calculate (generate) the induced voltage in the motor 40 is described. The rotation angle estimation circuit 77 includes a phase induced voltage calculation circuit 84. The phase induced voltage calculation circuit 84 receives the phase current values Iu, Iv, and Iw, and the phase terminal voltage values Vu, Vv, and Vw. On the basis of the phase current values Iu, Iv, and Iw, and the phase terminal voltage values Vu, Vv, and Vw, the phase induced voltage calculation circuit 84 calculates phase induced voltage values eu, ev, and ew in the three-phase AC coordinate system by taking into account their respective phase coil resistances.

The rotation angle estimation circuit 77 further includes an induced voltage calculation circuit 85. The induced voltage calculation circuit 85 receives the phase induced voltage values eu, ev, and ew generated by the phase induced voltage calculation circuit 84, and the previous value of the estimated electrical angle θmb calculated one control period before the present control period. On the basis of the previous value of the estimated electrical angle θmb, the induced voltage calculation circuit 85 converts the phase induced voltage values eu, ev, and ew to two phase induced voltage values ed and eq in the d/q coordinate system. The induced voltage calculation circuit 85 then calculates and generates an induced voltage value E (in absolute value) that is the square root of the sum of the squares of the two phase induced voltage values ed and eq.

Further, the induced voltage calculation circuit 85 calculates and generates an electrical angle difference Δθm on the basis of the two phase induced voltage values ed and eq. When there is a difference between the actual electrical angle and the estimated electrical angle θmb, a two-phase γ/δ coordinate system based on the estimated electrical angle θmb is displaced with respect to the two-phase d/q coordinate system. In this case, a current vector used for current vector control is displaced with respect to the q-axis of the two-phase d/q coordinate system. For example, when the γ/δ coordinate system leads the d/q coordinate system, the motor 40 loses synchronization, for example, because a rotor of the motor 40 rotates in a direction opposite to the direction of generated torque. In order to reduce the likelihood of the motor 40 losing synchronization in this way, the estimated electrical angle θmb is corrected such that the γ/δ coordinate system lags the d/q coordinate system.

The induced voltage calculation circuit 85 calculates the electrical angle difference Δθm that is used to correct the estimated electrical angle θmb. Specifically, the induced voltage calculation circuit 85 first calculates an induced voltage value eγ on a γ-axis of the γ/δ coordinate system on the basis of the induced voltage value eq in the d/q coordinate system. On the basis of the fact that the induced voltage value E is generated in the d/q coordinate system, the induced voltage calculation circuit 85 calculates the sine of the induced voltage value eγ (in absolute value) divided by the induced voltage value E, thereby calculating the electrical angle difference Δθm.

The rotation angle estimation circuit 77 further includes an angular velocity calculation circuit 86. The angular velocity calculation circuit 86 receives the induced voltage value E generated by the induced voltage calculation circuit 85. On the basis of the induced voltage value E, the angular velocity calculation circuit 86 calculates and generates an estimated angular velocity ωe. The estimated angular velocity ωe is an estimated value of an angular velocity of the motor 40, i.e., an estimated value of a rotational velocity of the motor 40 that is the rate of change in the rotation angle θma of the motor 40. The induced voltage value E and the estimated angular velocity ωe are proportional to each other. The estimated angular velocity ωe is calculated by dividing the induced voltage value E by a predetermined induced voltage constant (a counter electromotive force constant). The rotation angle θma of the motor 40 has a correlation with a steering angle θs (refer to FIG. 1) that is a rotation angle of the steering wheel 10 (the steering shaft 11). Therefore, the angular velocity of the motor 40, i.e., the rotational velocity of the motor 40 has a correlation with a steering velocity ωs that is the rate of change in the steering angle θs of the steering wheel 10.

The rotation angle estimation circuit 77 further includes a steering-hold determination circuit 87. The steering-hold determination circuit 87 receives the estimated angular velocity ωe generated by the angular velocity calculation circuit 86, the induced voltage value E, and the steering torque Trq. The steering-hold determination circuit 87 determines whether the estimated angular velocity ωe and the steering torque Trq fall within their respective predetermined steering-hold determination threshold ranges, thereby determining whether the steering wheel 10 is in a steering-hold state where a driver holds the steering wheel 10 without operating the steering wheel 10. The steering-hold determination threshold ranges are set empirically such that whether the steering wheel 10 is in the steering-hold state is determinable on the basis of the steering-hold determination threshold ranges. When the induced voltage value E is greater than a later-described threshold voltage value Eth, the steering-hold determination circuit 87 uses the estimated angular velocity ωe without any processing. In contrast, when the induced voltage value E is less than or equal to the threshold voltage value Eth, the steering-hold determination circuit 87 uses a zero value as the estimated angular velocity ωe. If the estimated angular velocity ωe and the steering torque Trq fall within their respective steering-hold determination threshold ranges, the steering-hold determination circuit 87 generates a steering-hold flag FLG such that the steering-hold flag FLG indicates that the steering wheel 10 is in the steering-hold state. In contrast, if at least one of the estimated angular velocity ωe and the steering torque Trq falls outside the respective steering-hold determination threshold ranges, the steering-hold determination circuit 87 generates the steering-hold flag FLG such that the steering-hold flag FLG indicates that the steering wheel 10 is not in the steering-hold state.

The first additional angle calculation circuit 80 receives the steering-hold flag FLG generated by the steering-hold determination circuit 87, the electrical angle difference Δθm generated by the induced voltage calculation circuit 85, the estimated angular velocity ωe, and the vehicle speed V. On the basis of the steering-hold flag FLG, the estimated angular velocity ωe, the electrical angle difference Δθm, and the vehicle speed V, the first additional angle calculation circuit 80 calculates and generates the first additional angle Δθm1 indicative of an additional amount to be added that is the amount of change in the estimated electrical angle θmb in one control period. How the first additional angle calculation circuit 80 calculates the first additional angle Δθm1 is described in detail later with reference to FIG. 5. The first additional angle calculation circuit 80 also receives the steering torque Trq and sets the sign of the first additional angle $\Delta\theta m1$ to positive or negative (i.e., determines whether to add or subtract the first additional angle $\Delta\theta m1$) by considering that the sign (positive or negative) of the steering torque Trq corresponds to the rotation direction of the motor 40.

The second additional angle calculation circuit 81 receives the steering-hold flag FLG generated by the steering-hold determination circuit 87, the steering torque Trq, and the vehicle speed V. On the basis of the steering-hold flag FLG, the steering torque Trq, and the vehicle speed V, the second additional angle calculation circuit 81 calculates and generates the second additional angle $\Delta\theta m2$ indicative of an additional amount to be added that is the amount of change in the estimated electrical angle $\theta mb$ in one control period. How the second additional angle calculation circuit 81 calculates the second additional angle $\Delta\theta m2$ is described in detail later with reference to FIG. 6. The second additional angle calculation circuit 81 sets the sign of the second additional angle $\Delta\theta m2$ to positive or negative (i.e., determines whether to add or subtract the second additional angle $\Delta\theta m2$) on the basis of the sign (positive or negative) of the steering torque Trq.

The switch circuit 82 receives the induced voltage value E generated by the induced voltage calculation circuit 85. If the induced voltage value E is greater than the threshold voltage value Eth (a positive value), the switch circuit 82 selects the first additional angle $\Delta\theta m1$ so that the first additional angle $\Delta\theta m1$ is added to the previous value of the estimated electrical angle $\theta mb$. In contrast, if the induced voltage value E is less than or equal to the threshold voltage value Eth, the switch circuit 82 selects the second additional angle $\Delta\theta m2$ so that the second additional angle $\Delta\theta m2$ is added to the previous value of the estimated electrical angle $\theta mb$.

According to the embodiment, the threshold voltage value Eth is set empirically such that whether the steering wheel 10 is in a low steering velocity state is determinable on the basis of the threshold voltage value Eth. The low steering velocity state is a state where the steering velocity $\omega s$ of the steering operation performed by a driver, corresponding to the estimated angular velocity $\omega e$ calculated on the basis of the induced voltage value E, is low. That is, the low steering velocity state is a state where the induced voltage value E falls within a predetermined range, i.e., less than or equal to the threshold voltage value Eth. In the low steering velocity state, it is expected that the induced voltage value E is small and the estimated electrical angle $\theta mb$ is estimated with low accuracy on the basis of the induced voltage value E. On the other hand, a normal steering velocity state (a non-low steering velocity state) that is not the low steering velocity state is a state where the induced voltage value E falls outside the predetermined range, i.e., greater than the threshold voltage value Eth. In the normal steering velocity state, it is expected that the induced voltage value E is large and the estimated electrical angle $\theta mb$ is estimated with high (not low) accuracy on the basis of the induced voltage value E.

The accumulator circuit 83 receives one of the first and second additional angles $\Delta\theta m1$ and $\Delta\theta m2$ that is selected by the switch circuit 82. The accumulator circuit 83 includes a memory circuit 83a that stores the previous value of the estimated electrical angle $\theta mb$ calculated one control period before the present control period. The accumulator circuit 83 adds the additional angle selected by the switch circuit 82 to the previous value of the estimated electrical angle $\theta mb$ stored in the memory circuit 83a, thereby calculating and generating the estimated electrical angle $\theta mb$.

While controlling the driving of the motor 40, the microcomputer 51 repeatedly generates the estimated electrical angle $\theta mb$ with the control period so as to enable the sensorless control through the rotation angle estimation circuit 77 in the event of the malfunction of the rotation angle sensor 61. Specifically, in a condition that ensures that the estimated electrical angle $\theta mb$ is estimated with high accuracy on the basis of the induced voltage value E, the microcomputer 51 calculates the estimated electrical angle $\theta mb$ on the basis of the induced voltage value E. Thus, the microcomputer 51 has a first estimation calculation state where the estimated electrical angle $\theta mb$ is calculated from a value that is obtained by accumulating the additional angle generated by the first additional angle calculation circuit 80.

In contrast, in a condition where the estimated electrical angle $\theta mb$ is estimated with low accuracy on the basis of the induced voltage value E (i.e., in a condition that does not ensure that the estimated electrical angle $\theta mb$ is estimated with high accuracy on the basis of the induced voltage value E), the microcomputer 51 calculates the estimated electrical angle $\theta mb$ on the basis of the steering torque Trq, instead of the induced voltage value E. Thus, the microcomputer 51 has a second estimation calculation state where the estimated electrical angle $\theta mb$ is calculated from a second that is obtained by accumulating the additional angle generated by the second additional angle calculation circuit 81. In this way, the microcomputer 51 switches between the first estimation calculation state and the second estimation calculation state when calculating the estimated electrical angle $\theta mb$.

Figure 5:
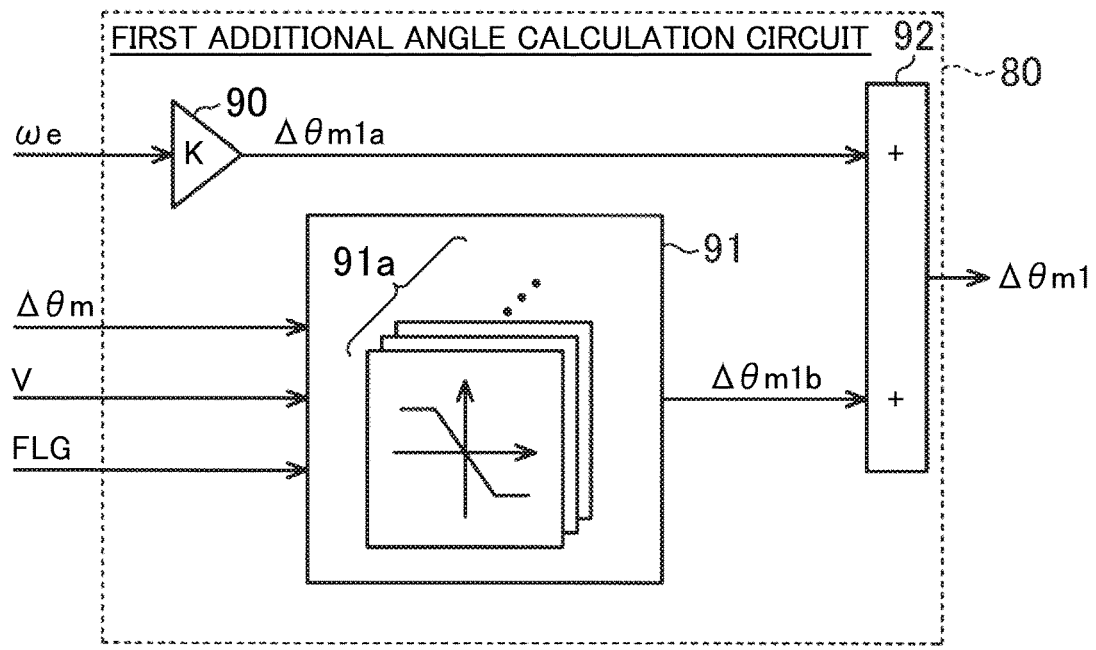
FIG. 5 is a block diagram illustrating the function of a first additional angle calculation unit of the rotation angle estimation circuit.

Next, the functions of the first additional angle calculation circuit 80 and the second additional angle calculation circuit 81 are described in more detail. As illustrated in FIG. 5, the first additional angle calculation circuit 80 includes the following: a base angle calculation circuit 90 that calculates and generates a base additional angle $\Delta\theta m1a$ as a base of the first additional angle $\Delta\theta m1$; and a correction angle calculation circuit 91 that calculates and generates a correction additional angle $\Delta\theta m1b$ for correcting the first additional angle $\Delta\theta m1$.

The base angle calculation circuit 90 receives the estimated angular velocity $\omega e$. The base angle calculation circuit 90 calculates and generates the base additional angle $\Delta\theta m1a$ by multiplying the estimated angular velocity $\omega e$ by a gain K corresponding to the control period.

The correction angle calculation circuit 91 receives the steering-hold flag FLG, the electrical angle difference $\Delta\theta m$, and the vehicle speed V. The correction angle calculation circuit 91 has a correction additional angle map 91a that defines a relationship between the electrical angle difference $\Delta\theta m$ and the correction additional angle $\Delta\theta m1b$. The correction angle calculation circuit 91 calculates the correction additional angle $\Delta\theta 1b$ from the electrical angle difference $\Delta\theta m$ as an input by using the correction additional angle map 91a. According to the embodiment, in order to correct the estimated electrical angle $\theta mb$ such that the $\gamma/\delta$ coordinate system lags the d/q coordinate system, the correction additional angle $\Delta\theta m1b$ is calculated such that the correction additional angle $\Delta\theta m1b$ has a sign (positive or negative) opposite to the sign of the steering torque Trq and that the absolute value of the correction additional angle $\Delta\theta m1b$ increases with an increase in the absolute value of the electrical angle difference $\Delta\theta m$.

The correction additional angle map 91a includes multiple maps that are classified by whether or not the steering wheel 10 is in the steering-hold state, and by the vehicle speed V. The maps included in the correction additional angle map 91a are selectively used in accordance with the steering-hold flag FLG and the vehicle speed V. Specifically, the correction additional angle map 91a includes multiple steering-hold state maps used in the steering-hold state, and multiple non-steering-hold state maps used in a non-steering-hold state that is not the steering-hold state. The steering-hold state maps are further classified by the vehicle speed V, and the non-steering-hold state maps are also further classified by the vehicle speed V.

For example, when the steering-hold flag FLG indicates the steering-hold state, the correction angle calculation circuit 91 selects one map corresponding to the vehicle speed V at that time from the steering-hold state maps included in the correction additional angle map 91a. After that, if the vehicle speed V increases, the correction angle calculation circuit 91 switches to another map corresponding to the increased vehicle speed V, and if the vehicle speed V decreases, the correction angle calculation circuit 91 switches to another map corresponding to the decreased vehicle speed V. When the steering-hold flag FLG indicates the non-steering-hold state, the correction angle calculation circuit 91 selects an appropriate map from the non-steering-hold state maps included in the correction additional angle map 91a in the same manner as described above for when the steering-hold flag FLG indicates the steering-hold state.

Figure 6:
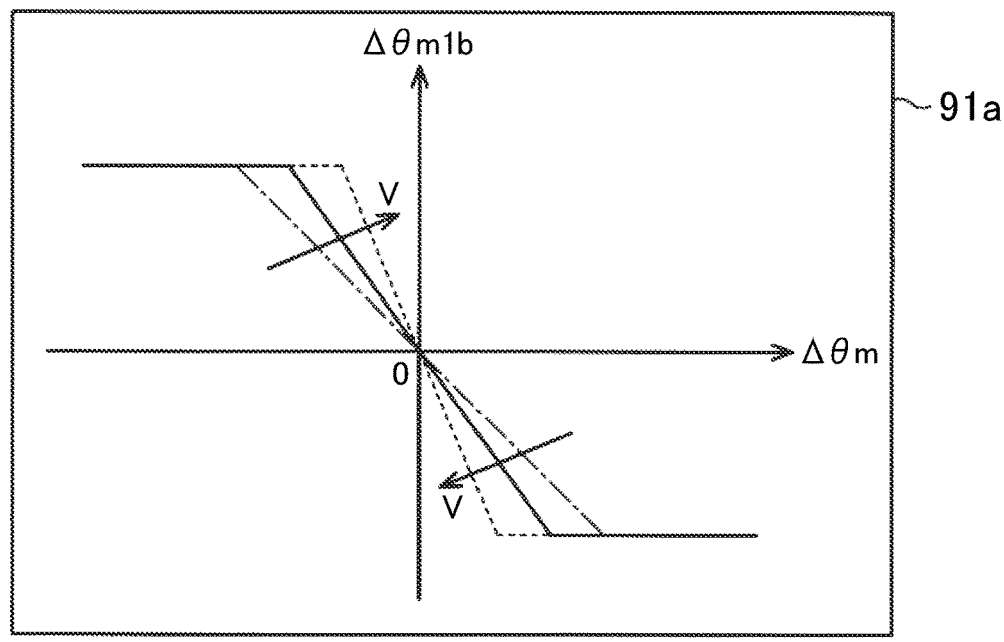
FIG. 6 is a diagram illustrating vehicle speed characteristics of a correction additional angle map that defines the relationship between an electrical angle difference and a correction additional angle.

FIG. 6 illustrates vehicle speed characteristics of the correction additional angle map 91a that defines the relationship between the electrical angle difference $\Delta\theta m$ and the correction additional angle $\Delta\theta m1b$. When the vehicle speed V has a normal speed value V0, the correction additional angle map 91a is set to the characteristic indicated by a continuous line in FIG. 6. The normal speed value V0 is determined by experiment or other suitable methods such that when the vehicle speed V has the normal speed value V0, the influence of disturbance on the electric power steering system 1 is small. When the vehicle speed V has a speed value V1 greater than the normal speed value V0, the correction additional angle map 91a is set to the characteristic indicated by a dashed line in FIG. 6. As illustrated in FIG. 6, the amount of the correction additional angle $\Delta\theta m1b$ to be added according to the characteristic indicated by the dashed line is greater than the amount of the correction additional angle $\Delta\theta m1b$ to be added according to the characteristic indicated by the continuous line. When the vehicle speed V has a speed value V2 less than the normal speed value V0, the correction additional angle map 91a is set to the characteristic indicated by a long dashed short dashed line in FIG. 6. As illustrated in FIG. 6, the amount of the correction additional angle $\Delta\theta m1b$ to be added according to the characteristic indicated by the long dashed short dashed line is less than the amount of the correction additional angle $\Delta\theta m1b$ to be added according to the characteristic indicated by the continuous line.

Thus, according to the embodiment, the correction additional angle map 91a defines the characteristics of the relationship between the electrical angle difference $\Delta\theta m$ and the correction additional angle $\Delta\theta m1b$ in such a manner that the amount of change in the correction additional angle $\Delta\theta m1b$ is variable (increases and decreases) with the vehicle speed V. Specifically, the correction additional angle map 91a defines the characteristics of the relationship between the electrical angle difference $\Delta\theta m$ and the correction additional angle $\Delta\theta m1b$ in such a manner that when the vehicle speed V is greater than the normal speed value, the amount of change in the correction additional angle $\Delta\theta m1b$ increases (i.e., a relative amount to be subtracted from the base additional angle $\Delta\theta m1a$ increases). Thus, as compared to when the vehicle speed V has the normal speed value, when the vehicle speed V is greater than the normal speed value, the range of the fluctuations in the estimated electrical angle θmb is increased, and the frequency of a vibration component of the fluctuations is increased. For example, the increased frequency may have a value that falls outside a frequency range (15 to 20 hertz (Hz)) that a driver is sensitive to. In the correction additional angle map 91a, although the steering-hold state maps differ in characteristics from the non-steering-hold state maps for the same values of the vehicle speed V, how the amount of change in the correction additional angle $\Delta\theta m1b$ varies with the vehicle speed V is common between the steering-hold state maps and the non-steering-hold state maps. The characteristics of the steering-hold state maps and the non-steering-hold state maps in the correction additional angle map 91a are set individually in the electric power steering system 1 in their respective steering states.

Further, the correction additional angle map 91a defines the characteristics of the relationship between the electrical angle difference $\Delta\theta m$ and the correction additional angle $\Delta\theta m1b$ in such a manner that when the vehicle speed V is less than the normal speed value, the amount of change in the correction additional angle $\Delta0m1b$ decreases (i.e., a relative amount to be subtracted from the base additional angle $\Delta\theta m1a$ decreases). Thus, as compared to when the vehicle speed V has the normal speed value, when the vehicle speed V is less than the normal speed value, the range of the fluctuations in the estimated electrical angle θmb is decreased, and the frequency of the vibration component of the fluctuations is decreased. For example, the decreased frequency may have a value that reduces the likelihood of the motor 40 losing synchronization.

An adder circuit 92 adds together the base additional angle $\Delta\theta m1a$ generated by the base angle calculation circuit 90 and the correction additional angle $\Delta\theta m1b$ generated by the correction angle calculation circuit 91, thereby generating the first additional angle $\Delta\theta m1$. The first additional angle $\Delta\theta m1$ is input to the switch circuit 82.

Figure 7:
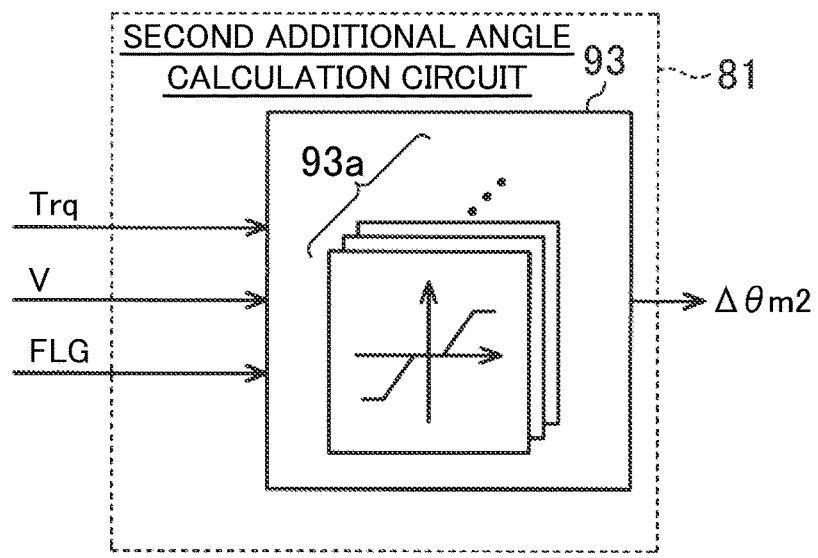
FIG. 7 is a block diagram illustrating the function of a second additional angle calculation unit of the rotation angle estimation circuit.

As illustrated in FIG. 7, the second additional angle calculation circuit 81 includes a second correction angle calculation circuit 93 that calculates and generates the second additional angle $\Delta\theta m2$. The second correction angle calculation circuit 93 receives the steering-hold flag FLG, the steering torque Trq, and the vehicle speed V. The second correction angle calculation circuit 93 has a torque additional angle map 93a that defines the relationship between steering torque Trq and the second additional angle $\Delta\theta m2$. The second correction angle calculation circuit 93 calculates the second additional angle $\Delta\theta m2$ from the steering torque Trq as an input by using the torque additional angle map 93a. According to the embodiment, the second additional angle $\Delta\theta m2$ is calculated such that the second additional angle $\Delta\theta m2$ has the same sign (positive or negative) as the steering torque Trq and that the absolute value of the second additional angle $\Delta\theta m2$ increases with an increase in the absolute value of the steering torque Trq. Further, the second additional angle $\Delta\theta m2$ is rendered ineffective in a dead zone around a zero value of the steering torque Trq. The correction additional angle map 91a and the torque additional angle map 93a are opposite in sigh (positive or negative) so that when the estimated electrical angle θmb based on the second additional angle $\Delta\theta m2$ generated from the torque additional angle map 93a is displaced greatly from the actual electrical angle, the displacement is reduced.

The torque additional angle map 93a includes multiple maps that are classified by whether or not the steering wheel 10 is in the steering-hold state, and by the vehicle speed V. The maps included in the torque additional angle map 93a are selectively used in accordance with the steering-hold flag FLG and the vehicle speed V. Specifically, the torque additional angle map 93a includes multiple steering-hold state maps used in the steering-hold state, and multiple non-steering-hold state maps used in the non-steering-hold state. The steering-hold state maps are further classified by the vehicle speed V, and the non-steering-hold state maps are also further classified by the vehicle speed V.

For example, when the steering-hold flag FLG indicates the steering-hold state, the second correction angle calculation circuit 93 selects one map corresponding to the vehicle speed V at that time from the steering-hold state maps included in the torque additional angle map 93a. After that, if the vehicle speed V increases, the second correction angle calculation circuit 93 switches to another map corresponding to the increased vehicle speed V, and if the vehicle speed V decreases, the second additional angle calculation circuit 93 switches to another map corresponding to the decreased vehicle speed V. When the steering-hold flag FLG indicates the non-steering-hold state, the second additional angle calculation circuit 93 selects an appropriate map from the non-steering-hold state maps included in the torque additional angle map 93a in the same manner as described above for when the steering-hold flag FLG indicates the steering-hold state.

Figure 8:
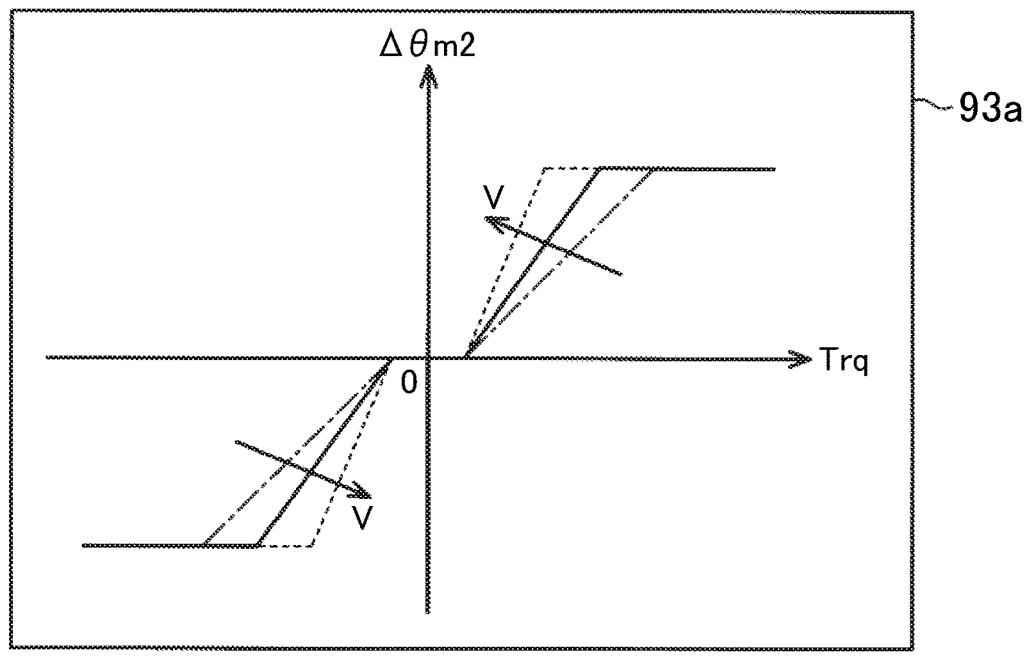
FIG. 8 is a diagram illustrating vehicle speed characteristics of a torque additional angle map that defines the relationship between steering torque and a torque additional angle.

FIG. 8 illustrates vehicle speed characteristics of the torque additional angle map 93a that defines the relationship between the steering torque Trq and the second additional angle $\Delta\theta m2$. When the vehicle speed V has the normal speed value V0, the torque additional angle map 93a is set to the characteristic indicated by a continuous line in FIG. 8. When the vehicle speed V has the speed value V1 greater than the normal speed value V0, the torque additional angle map 93a is set to the characteristic indicated by a dashed line in FIG. 8. As illustrated in FIG. 8, the amount of the second additional angle $\Delta\theta m2$ to be added according to the characteristic indicated by the dashed line is greater than the amount of the second additional angle $\Delta\theta m2$ to be added according to the characteristic indicated by the continuous line. When the vehicle speed V has the speed value V2 less than the normal speed value V0, the torque additional angle map 93a is set to the characteristic indicated by a long dashed short dashed line in FIG. 8. As illustrated in FIG. 8, the amount of the second additional angle $\Delta\theta m2$ to be added according to the characteristic indicated by the long dashed short dashed line is less than the amount of the second additional angle $\Delta\theta m2$ to be added according to the characteristic indicated by the continuous line.

Thus, according to the embodiment, the torque additional angle map 93a defines the characteristics of the relationship between steering torque Trq and the second additional angle $\Delta\theta m2$ in such a manner that the amount of change in the second additional angle $\Delta\theta m2$ is variable (increases and decreases) with the vehicle speed V. Specifically, the torque additional angle map 93a defines the characteristics of the relationship between steering torque Trq and the second additional angle $\Delta\theta m2$ in such a manner that when the vehicle speed V is greater than the normal speed value, the amount of change in the second additional angle $\Delta\theta m2$ (i.e., the amount of the second additional angle $\Delta\theta m2$ to be added) increases. Thus, as compared to when the vehicle speed V has the normal speed value, when the vehicle speed V is greater than the normal speed value, the range of the fluctuations in the estimated electrical angle $\theta mb$ is increased, and the frequency of the vibration component of the fluctuations is increased. For example, the increased frequency may have a value that falls outside a frequency range (15 to 20 hertz (Hz)) that a driver is sensitive to. In the torque additional angle map 93a, although the steering-hold state maps differ in characteristics from the non-steering-hold state maps for the same values of the vehicle speed V, how the amount of change in the second additional angle $\Delta\theta m2$ varies with the vehicle speed V is common between the steering-hold state maps and the non-steering-hold state maps. The characteristics of the steering-hold state maps and the non-steering-hold state maps in the torque additional angle map 93a are set individually in the electric power steering system 1 in their respective steering states.

Further, the torque additional angle map 93a defines the characteristics of the relationship between steering torque Trq and the second additional angle $\Delta\theta m2$ in such a manner that when the vehicle speed V is less than the normal speed value, the amount of change in the second additional angle $\Delta\theta m2$ (i.e., the amount of the second additional angle $\Delta\theta m2$ to be added) decreases. Thus, as compared to when the vehicle speed V has the normal speed value, when the vehicle speed V is less than the normal speed value, the range of the fluctuations in the estimated electrical angle $\theta mb$ is decreased, and the frequency of the vibration component of the fluctuations is decreased. For example, the decreased frequency may have a value that reduces the likelihood of the motor 40 losing synchronization.

The second additional angle $\Delta\theta m2$ generated by the second correction angle calculation circuit 93 is input to the switch circuit 82. In conclusion, while the microcomputer 51 performs the sensorless control of the driving of the motor 40, the first additional angle calculation circuit 80 and the second additional angle calculation circuit 81 respectively generate the first additional angle $\Delta\theta m1$ and the second additional angle $\Delta\theta m2$ repeatedly with the control period in accordance with the vehicle speed V and whether or not the steering wheel 10 is in the steering-hold state, thereby changing the frequency of the vibration component of the fluctuations in the estimated electrical angle $\theta mb$.

Actions and effects of the embodiment are described below.

(1) According to the embodiment, varying the amount of change in the first additional angle $\Delta\theta m1$ and the second additional angle $\Delta\theta m2$ controls the fluctuations in the estimated electrical angle $\theta mb$, and thus allows to control the likelihood of the motor 40 vibrating or losing synchronization due to the fluctuations in the estimated electrical angle $\theta mb$. For example, the fluctuations in the estimated electrical angle $\theta mb$ may be adjusted in such a way as to suppress the interference of vibrations of the motor 40 with steering operation by a driver, or in such a way as to reduce the frequency with which the motor 40 loses synchronization in order to reduce drag that a driver feels when he or she performs the steering operation. Thus, steering feel is flexibly adjustable. This makes it possible to improve the influence of the fluctuations in the estimated electrical angle $\theta mb$ on steering feel.

(2) According to the embodiment, when the estimated electrical angle $\theta mb$ is calculated, the microcomputer 51 is allowed to increase the amount of change in the first additional angle $\Delta\theta m1$ and the second additional angle $\Delta\theta m2$ in order to increase the range of the fluctuations in the estimated electrical angle $\theta mb$, so that the frequency of the vibration component of the fluctuations is increased. This enables the frequency of the vibration component of the fluctuations in the estimated electrical angle θmb to fall outside a frequency range (e.g., 15 to 20 hertz (Hz)) that a driver is sensitive to. Thus, this effectively suppresses the interference of vibrations of the motor 40, caused by the fluctuations in the estimated electrical angle θmb, with the steering operation by a driver, thereby improving steering feel.

(3) According to the embodiment, when the estimated electrical angle θmb is calculated, the microcomputer 51 is allowed to decrease the amount of change in the first additional angle Δθm1 and the second additional angle Δθm2 in order to decrease the range of the fluctuations in the estimated electrical angle θmb, so that the frequency of the vibration component of the fluctuations is decreased. This enables the frequency of the vibration component of the fluctuations in the estimated electrical angle θmb to have a value that reduces the likelihood of the motor 40 losing synchronization. Thus, this effectively reduces drag, caused by the fluctuations in the estimated electrical angle θmb, that a driver feels when he or she performs the steering operation, thereby improving steering feel.

(4) According to the embodiment, the microcomputer 51 varies the amount of change in the first additional angle Δθm1 and the second additional angle Δθm2 in accordance with the vehicle speed V. Specifically, as illustrated in FIGS. 6 and 8, when the vehicle speed V is greater than the normal speed value (V0) (indicated by a dashed line in FIGS. 6 and 8 as the characteristic for when the vehicle speed V has the speed value V1), the microcomputer 51 increases the amount of change in the first additional angle Δθm1 and the second additional angle Δθm2 to increase the frequency of the vibration component of the fluctuations in the estimated electrical angle θmb. On the other hand, when the vehicle speed V is less than the normal speed value (V0) (indicated by a long dashed short dashed line in FIGS. 6 and 8 as the characteristic for when the vehicle speed V has the speed value V2), the microcomputer 51 decreases the amount of change in the first additional angle Δθm1 and the second additional angle Δθm2 to decrease the frequency of the vibration component of the fluctuations in the estimated electrical angle θmb.

Since the vehicle speed V is used as an indicator to vary the amount of change in the first additional angle Δθm1 and the second additional angle Δθm2, steering feel is more flexibly adjustable.

When the vehicle speed V is greater than the normal speed value, the likelihood of the steering wheel 10 being turned sharply is low, and therefore steering feel is more affected by vibrations of the motor 40. In this situation, the microcomputer 51 increases the frequency of the vibration component of the fluctuations in the estimated electrical angle θmb, thereby suppressing the interference of the vibrations of the motor 40 with the steering operation by a driver.

On the other hand, when the vehicle speed is less than the normal speed value, the steering wheel 10 may be turned sharply, and therefore steering feel is more affected by drag that a driver feels when he or she performs the steering operation. In this situation, the microcomputer 51 decreases the frequency of the vibration component of the fluctuations in the estimated electrical angle θmb, thereby reducing drag that a driver feels when he or she performs the steering operation.

As described above, the microcomputer 51 optimizes the level of the frequency of the vibration component of the fluctuations in the estimated electrical angle θmb for the situations, thus achieving better steering feel. (5) According to the embodiment, the microcomputer 51 switches between the first estimation calculation state and the second estimation calculation state in accordance with whether or not the induced voltage value E is greater than the threshold voltage value Eth, thereby achieving sensorless control appropriate to the induced voltage value E.

In contrast to the embodiment, it is assumed here that the microcomputer 51 varies only, for example, the amount of change in the second additional angle Δθm2 to improve steering feel. In this case, if the microcomputer 51 switches from the second estimation calculation state to the first estimation calculation state, with the amount of change in the second additional angle Δθm2 being increased, the estimated electrical angle θmb tends to be displaced greatly from the actual electrical angle from immediately after the switching is done. As a result, the estimated electrical angle θmb becomes unstable, so that steering feel becomes degraded.

In contrast to this assumption, according to the embodiment, the microcomputer 51 varies the amount of change in both the first additional angle Δθm1 and the second additional angle Δθm2. Thus, even when the estimated electrical angle θmb is displaced greatly from the actual electrical angle immediately after the switching from the second estimation calculation state to the first estimation calculation state is done, an adjustment is made to reduce the displacement.

Specifically, according to the embodiment, the correction additional angle map 91a and the torque additional angle map 93a are opposite in sigh (positive or negative) so that when the estimated electrical angle θmb based on the second additional angle Δθm2 generated from the torque additional angle map 93a is displaced greatly from the actual electrical angle, the displacement is reduced. This feature reduces the likelihood of the estimated electrical angle becoming unstable. Thus, this feature suppresses the degradation of steering feel and, in turn, improves steering feel.

(6) According to the embodiment, the driving of the motor 40 is normally controlled by using the rotation angle θma detected by the rotation angle sensor 61. When the rotation angle sensor 61 malfunctions, the sensorless control is performed to continue the supply of the assist force to the steering mechanism 2 while suppressing the degradation of steering feel.

The embodiment described above may be modified in various ways. Some examples of the modifications are described below. The microcomputer 51 may be configured to normally control the motor 40 only by performing the sensorless control that calculates the estimated electrical angle θmb on the basis of the induced voltage in the motor 40.

The rotation angle estimation circuit 77 may vary the amount of change in at least one of the first additional angle Δθm1 and the second additional angle Δθm2. In this case, of the two additional angle calculation circuits 80 and 81, one additional angle calculation circuit that does not vary the amount of change in a corresponding additional angle may be configured not to receive information, such as the steering-hold flag FLG, necessary to vary the amount of change in the additional angle.

The first additional angle calculation circuit 80 may be configured not to perform correction based on the electrical angle difference Δθm. In this case, the first additional angle calculation circuit 80 may receive at least the estimated angular velocity ωe and the steering torque Trq.

The first additional angle calculation circuit 80 and the second additional angle calculation circuit 81 may use another indicator, instead of or in addition to the vehicle speed V, to make a determination of whether the steering wheel 10 is in the steering-hold state and may adjust the frequency of the vibration component of the fluctuations in the estimated electrical angle θmb on the basis of the result of the determination. Examples of such an indicator may include the estimated angular velocity ωe, the induced voltage value E, and the steering torque Trq. Specifically, the amount of change in the first additional angle Δθm1 and the second additional angle Δθm2 may be set greater in the steering-hold state than in the non-steering-hold state so that the frequency of the vibration component of the fluctuations in the estimated electrical angle θmb becomes greater in the steering-hold state than in the non-steering-hold state. This approach suppresses the interference of vibrations of the motor 40, caused by the fluctuations in the estimated electrical angle θmb, with the steering operation by a driver, thus reducing the likelihood that the vibrations, in particular, generated in the steering-hold state makes it hard for a driver to perform the steering operation. Alternatively, the amount of change in the first additional angle Δθm1 and the second additional angle Δθm2 may be set less in the steering-hold state than in the non-steering-hold state so that the frequency of the vibration component of the fluctuations in the estimated electrical angle θmb becomes less in the steering-hold state than in the non-steering-hold state. This approach reduces drag, caused by the loss of synchronization of the motor 40 due to the fluctuations in the estimated electrical angle θmb, that a driver feels when he or she performs the steering operation, thus reducing the likelihood that the loss of synchronization, in particular, in the steering-hold state makes it hard for a driver to perform the steering operation.

The steering-hold determination circuit 87 may determine whether the steering wheel 10 is in the steering-hold state, on the basis of the fact that switching between the first estimation calculation state and the second estimation calculation state occurs more frequently in the steering-hold state. For example, when a frequency with which switching between the first estimation calculation state and the second estimation calculation state occurs falls outside a predetermined threshold range, the steering-hold determination circuit 87 may determine that the steering wheel 10 is in the steering-hold state, and when the switching frequency falls within the predetermined threshold range, the steering-hold determination circuit 87 may determine that the steering wheel 10 is in the non-steering-hold state.

The current command value calculation circuit 70 may use at least the steering torque Trq to calculate the q-axis current command value Iq*. That is, the current command value calculation circuit 70 may calculate the q-axis current command value Iq* without using the vehicle speed V. Alternatively, the q-axis current command value Iq* may be calculated using the steering torque Trq, the vehicle speed V, and other suitable elements.

In the embodiment, if the vehicle is equipped with a steering angle sensor that detects the steering angle θs changing with rotation of the steering wheel 10, the steering angle θs may be used as the rotation angle of the motor 40.

In the embodiment, the electric power steering system 1 is a column type in which an assist force is supplied to the column shaft 11a. Alternatively, the electric power steering system 1 may be a rack assist type in which an assist force is supplied to the rack shaft 12. When the electric power steering system 1 is the rack assist type, the torque sensor 60 may be provided, for example, to the pinion shaft 11c, or may be provided to the column shaft 11a in the same manner as described in the embodiment.

The modifications described above may be combined in various ways. For example, the modification where the electric power steering system 1 is the rack assist type may be combined with any of the other modifications.

What is claimed is:

1. A steering control unit comprising:
a control circuit configured to perform sensorless control of driving of a motor by using an estimated electrical angle estimated by calculation, the motor being a source of an assist force that is supplied to a steering mechanism on the basis of steering torque that is input to the steering mechanism to steer a steered wheel of a vehicle, wherein
the control circuit calculates an additional angle when calculating the estimated electrical angle,
the control circuit calculates the estimated electrical angle from a value that is obtained by accumulating the additional angle, and
the control circuit adjusts a vibration component of fluctuations in the estimated electrical angle by varying an amount of change in the additional angle.

2. The steering control unit according to claim 1, wherein when calculating the estimated electrical angle, the control circuit increases the amount of change in the additional angle to increase a frequency of the vibration component.

3. The steering control unit according to claim 1, wherein when calculating the estimated electrical angle, the control circuit decreases the amount of change in the additional angle to decrease a frequency of the vibration component.

4. The steering control unit according to claim 1, wherein the control circuit varies the amount of change in the additional angle in accordance with a vehicle speed of the vehicle,
when the vehicle speed is greater than a predetermined normal speed value, the control circuit increases the amount of change in the additional angle to increase a frequency of the vibration component, and
when the vehicle speed is less than the normal speed value, the control circuit decreases the amount of change in the additional angle to decrease the frequency of the vibration component.

5. The steering control unit according to claim 1, wherein the control circuit has a first estimation calculation state when a voltage induced in the motor is greater than a predetermined threshold voltage value, and has a second estimation calculation state when the induced voltage is less than or equal to the threshold voltage value,
in the first estimation calculation state, the control circuit calculates the estimated electrical angle from the induced voltage and a value that is obtained by accumulating a first additional angle calculated on the basis of an estimated angular velocity based on the induced voltage and an electrical angle difference between the estimated electrical angle and an actual electrical angle,
in the second estimation calculation state, the control circuit calculates the estimated electrical angle from a value that is obtained by accumulating a second additional angle calculated on the basis of the steering torque, and
when calculating the estimated electrical angle, the control circuit adjusts the vibration component by varying an amount of change in the first additional angle in the first estimation calculation state and by varying an amount of change in the second additional angle in the second estimation calculation state.

6. The steering control unit according to claim 1, wherein
when a rotation angle sensor that detects a rotation angle of the motor does not malfunction, the control circuit controls the driving of the motor by using an electrical angle that is obtained from the rotation angle detected by the rotation angle sensor, and when the rotation angle sensor malfunctions, the control circuit performs the sensorless control as backup control.

* * * * *